US006552531B1

(12) United States Patent
Fey et al.

(10) Patent No.: US 6,552,531 B1
(45) Date of Patent: Apr. 22, 2003

(54) METHOD AND CIRCUIT FOR PROCESSING SIGNALS FOR A MOTION SENSOR

(75) Inventors: Wolfgang Fey, Niedernhausen (DE); Mario Engelmann, Steinbach/Ts. (DE); Leonhard Link, Hofheim (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/807,590

(22) PCT Filed: Oct. 12, 1999

(86) PCT No.: PCT/EP99/07622
§ 371 (c)(1),
(2), (4) Date: Apr. 13, 2001

(87) PCT Pub. No.: WO00/22441
PCT Pub. Date: Apr. 20, 2000

(30) Foreign Application Priority Data

Oct. 14, 1998 (DE) .......................... 198 47 326
May 26, 1999 (DE) .......................... 199 24 113

(51) Int. Cl.[7] .............. G01B 7/00; G01B 7/14; G01P 3/42; G01P 3/46; G01P 3/66
(52) U.S. Cl. ................ 324/207.12; 324/207.2; 324/160; 324/163; 324/165; 324/173
(58) Field of Search .................... 324/165, 207.25, 324/166, 174, 207.12, 160, 163, 173; 73/861.78

(56) References Cited

U.S. PATENT DOCUMENTS

| | | | | |
|---|---|---|---|---|
| 3,455,162 A | * | 7/1969 | Michener et al. ......... | 324/702.2 |
| 3,944,923 A | * | 3/1976 | Luteran ..................... | 324/165 |
| 4,076,330 A | * | 2/1978 | Leiber ........................ | 303/92 |
| 4,095,179 A | * | 6/1978 | Bremer et al. ............. | 324/207 |
| 4,431,930 A | * | 2/1984 | Monticelli ................. | 307/520 |
| 4,629,982 A | * | 12/1986 | Kieslich | |
| 4,667,338 A | * | 5/1987 | Toypnaga et al. ......... | 377/45 |
| 4,785,242 A | * | 11/1988 | Vaidya et al. .............. | 324/208 |
| 4,961,014 A | * | 10/1990 | Kasahara ................... | 307/520 |
| 4,962,470 A | | 10/1990 | Hansen ...................... | 702/151 |

(List continued on next page.)

FOREIGN PATENT DOCUMENTS

| | | |
|---|---|---|
| DE | 29 30 793 | 2/1981 |
| DE | 31 09 507 | 9/1982 |
| DE | 32 34 383 | 3/1984 |
| DE | 34 34 952 | 4/1986 |
| DE | 38 24 671 | 1/1990 |
| DE | 42 25 819 | 2/1993 |
| DE | 43 23 910 | 1/1995 |
| DE | 44 09 708 | 9/1995 |
| DE | 197 30 806 | 1/1999 |
| EP | 0 343 317 | 11/1989 |
| GB | 2 309 311 | 7/1997 |
| WO | 98 09173 | 3/1998 |

OTHER PUBLICATIONS

Search Report of the German Patent Office for Application No. 199 24 113.9, Oct. 19, 1989.

*Primary Examiner*—N. Le
*Assistant Examiner*—Wasseem H. Hamdan
(74) *Attorney, Agent, or Firm*—Rader, Fishman & Grauer PLLC

(57) ABSTRACT

The present invention relates to a method and a circuit arrangement for processing signals for an active motion sensor which generates at least one first sequence of input pulses that contain motion information. By at least one integrating filter circuit, each input pulse of a pulse train is integrated, and an associated output pulse is generated during a period in which the integrated signal is in excess of a predeterminable second threshold value after a predeterminable first threshold value has been exceeded so that the output pulse has a time delay with respect to the input pulse. As a result, noises of a duration which is shorter than the delay time are effectively suppressed.

10 Claims, 5 Drawing Sheets

U.S. PATENT DOCUMENTS

| | | | |
|---|---|---|---|
| 5,043,653 A | * 8/1991 | Foster et al. | 322/32 |
| 5,103,171 A | * 4/1992 | Petersen | 324/207.23 |
| 5,252,919 A | * 10/1993 | Uemura | 324/207.25 |
| 5,442,283 A | * 8/1995 | Vig. et al. | 324/207.2 |
| 5,480,412 A | * 1/1996 | Mouchawar et al. | 607/6 |
| 5,486,759 A | * 1/1996 | Seiler et al. | 324/207.2 |
| 5,500,585 A | * 3/1996 | Aab | 324/165 |
| 5,650,719 A | * 7/1997 | Moody et al. | 324/166 |
| 5,670,877 A | * 9/1997 | Sceiber | 324/207.25 |
| 5,835,041 A | * 11/1998 | Zydek et al. | 341/143 |
| 5,907,298 A | 5/1999 | Kiriyama et al. | 341/111 |
| 5,952,876 A | * 9/1999 | Sakoda et al. | 327/551 |
| 6,104,185 A | * 8/2000 | Lamm et al. | 324/207.2 |
| 6,339,322 B1 | * 1/2002 | Loreck et al. | 324/166 |

* cited by examiner

METHOD AND CIRCUIT FOR PROCESSING SIGNALS FOR A MOTION SENSOR

TECHNICAL FIELD

The present invention generally relates to a system for reducing noise in an electrical signal and more particularly relates to a method and a circuit arrangement for processing signals for an active motion sensor which generates a sequence of input pulses.

BACKGROUND OF THE INVENTION

Active motion sensors are generally comprised of a pick-up for measuring data with a magnetostatically sensitive element with a permanent magnet (sensor element) which is coupled magnetically to an encoder (measuring data emitter) that executes a motion being sensed. The sensor element responds to a change in the flux density or the field vector which is induced by this motion. The output signal of the sensor element is sent to a modulator which either generates a periodic sensor voltage or a periodic sensor current, and the frequency is determined by the motional speed.

A special advantage of these active sensors compared to prior art passive sensors includes that the voltage of the sensor signal developed is irrespective of the motional behavior and, especially, the motional speed so that level adaptions and protection circuits are virtually unnecessary. Active motion sensors are increasingly employed for this reason. Depending on the design, a pulse voltage or a pulse current is generally produced which is sent as a sensor signal to a signal processing device to be conditioned and evaluated and, thereafter, transmitted as a motion signal to a traction or brake slip control system.

However, provisions must be made in this arrangement to prevent noises and, in the event of noises occurring nevertheless, prevent reactions which might jeopardize the vehicle's operation. In this respect, a distinction must be made between noises which cause a total failure of the sensor signal and noises which influence this signal in such a manner that the affected control no longer reacts in a way appropriate for the actual vehicle operating condition. These last-mentioned noises may be caused, for example, by ignition pulses, ESD discharges, and other signals, the duration of which may amount up to a third of the duration of the useful signal. The result of the noises is that by superposition on the sensor signal the said's frequency is temporarily changed, and a change in the motional speed is thereby indicated erroneously by the signal processing device.

Because a distinction between a change in the sensor signal due to an actual change of the motional behavior and a noise-induced change which impairs the sensor signal is difficult and intricate to make, one has so far obviously refrained from taking precautions for preventing a possible misinterpretation of the sensor signal.

SUMMARY OF THE INVENTION

An object of the present invention is to provide a method and a circuit arrangement for processing signals for an active motion sensor of the type referred to hereinabove which permits preventing the effects of noises that occur only temporarily and in a way that might lead to misinterpretation of the sensor signal.

This object is achieved by a method for processing signals for an active motion sensor of the type referred to hereinabove which is characterized in that each input pulse of a pulse train is integrated and an associated output pulse is generated during a period in which the integrated signal is in excess of a predeterminable second threshold value after a predeterminable first threshold value is exceeded so that the output pulse has a time delay with respect to the input pulse.

Further, this object is achieved in a circuit arrangement for processing signals for an active motion sensor of the type referred to hereinabove which includes at least one integrating filter circuit by which each input pulse of a pulse train is integrated and an associated output pulse is generated during a period in which the integrated signal is in excess of a predeterminable second threshold value after a predeterminable first threshold value has been exceeded so that the output pulse has a time delay with respect to the input pulse.

The advantage of these solutions is that noises which are shorter than the delay time will extend this time only slightly and can be rated as minor speed variation within a tolerable range. Only those noises which last longer than the delay that is due to the integration can cause a fault which, however, will only occur with this time delay.

Accordingly, the integrating filter circuit may be an analog filter with a capacitor and at least one current source to which can be sent the input pulse for charging the capacitor and for generating the integrated signal, and the first and the second threshold value is in each case defined by a predetermined voltage value which declines at the capacitor.

As an alternative, the integrating filter circuit may also be a digital filter with at least one counter, to which the input pulse can be sent for activation, wherein the integrated signal represents a counter reading, and the first and the second threshold value is respectively defined by a predetermined counter reading that is to be reached.

DETAILED DESCRIPTION OF THE PREFERRED EMBODIMENTS

Figure 1:
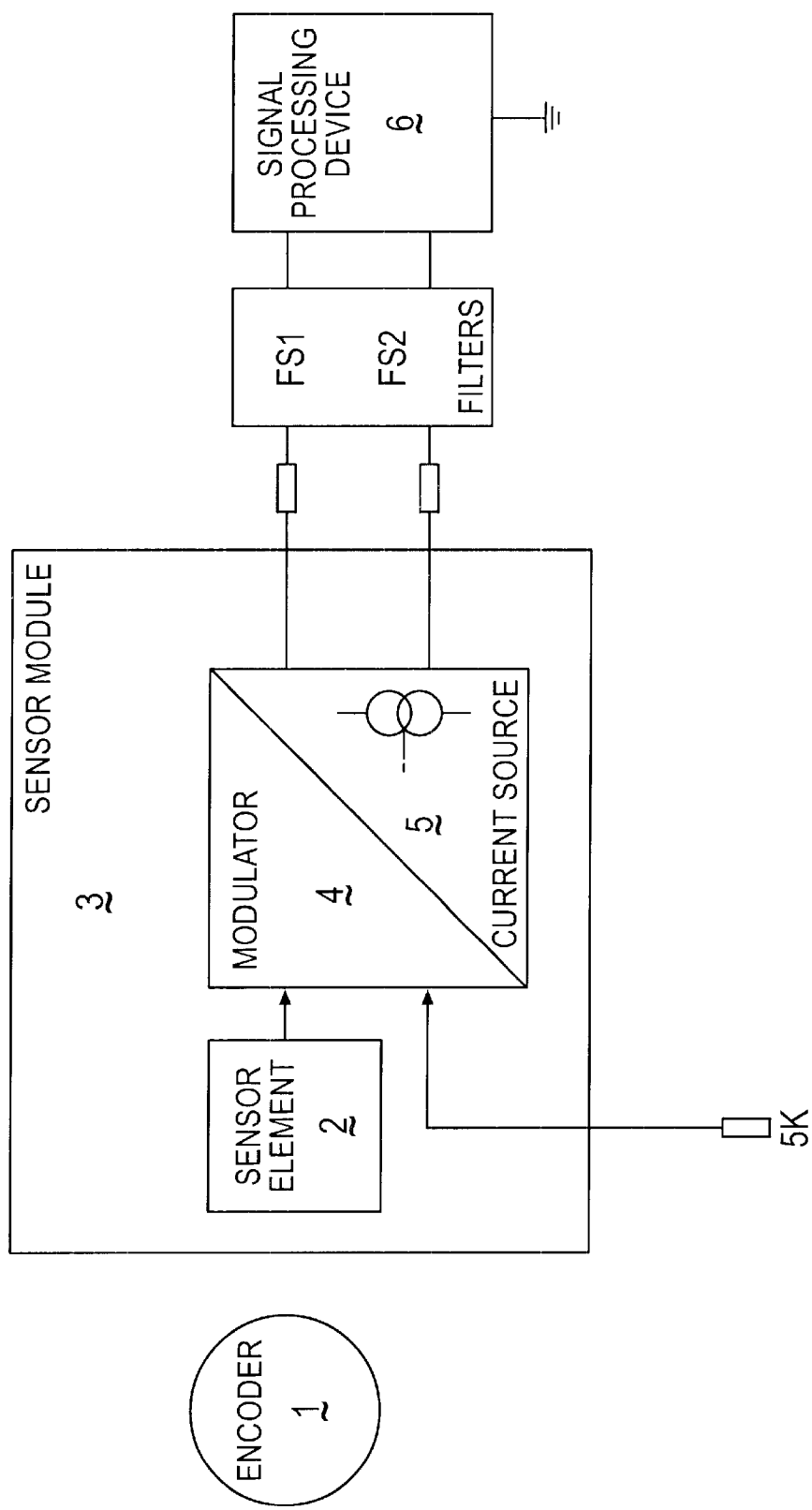
FIG. 1 is a basic flow diagram of a sensor assembly with a signal-processing device for active motion sensors.

FIG. 1 shows a general basic flow diagram of a sensor assembly with a circuit arrangement for processing signals for active motion sensors. In the case illustrated, there is provision of an encoder 1 which executes a rotation being sensed and acts upon a sensor element 2 by way of a change of the flux density or of the field vector. The sensor element is part of an assembly unit comprised in a sensor module 3 and including a modulator 4 and a current source 5. The modulator 4 controls the current source in dependence on the output signal of the sensor element 2 and an optional data signal input by way of an additional port K5 so that a first sequence of input pulses containing motion information and a second sequence of input pulses containing additional information is generated. Thus, a so-called three-level sensor is concerned which, in contrast to two-level sensors, permits transmitting additional information (data) besides the motion information. For the suppression of noises, these two pulse trains are sent to a first and a second filter circuit FS1, FS2, the output pulses of which are further processed in the signal processing device 6.

To suppress the above-mentioned type of noises, the first and second filter circuit FS1, FS2 will be described hereinbelow with respect to the FIGS. 2 and 4. With regard to the selection of the filter circuit, a distinction should be made between a noise of the motion signal and a noise of the data signal. Because the motion signal is taken into consideration for the calculation of a dynamic vehicle condition, it requires filtering in an especially noise-free manner. Provision of the first filter circuit with an integrated analog filter is advisable for this purpose according to FIG. 2 because the filter has a largely constant delay and jitter immunity.

Generally, the data signals are not relevant for driving dynamics to the same extent so that more errors can be tolerated. For this reason, the employment of the second filter circuit with an integrated digital filter and digital delay elements as illustrated in FIG. 4 is generally sufficient.

Figure 2:
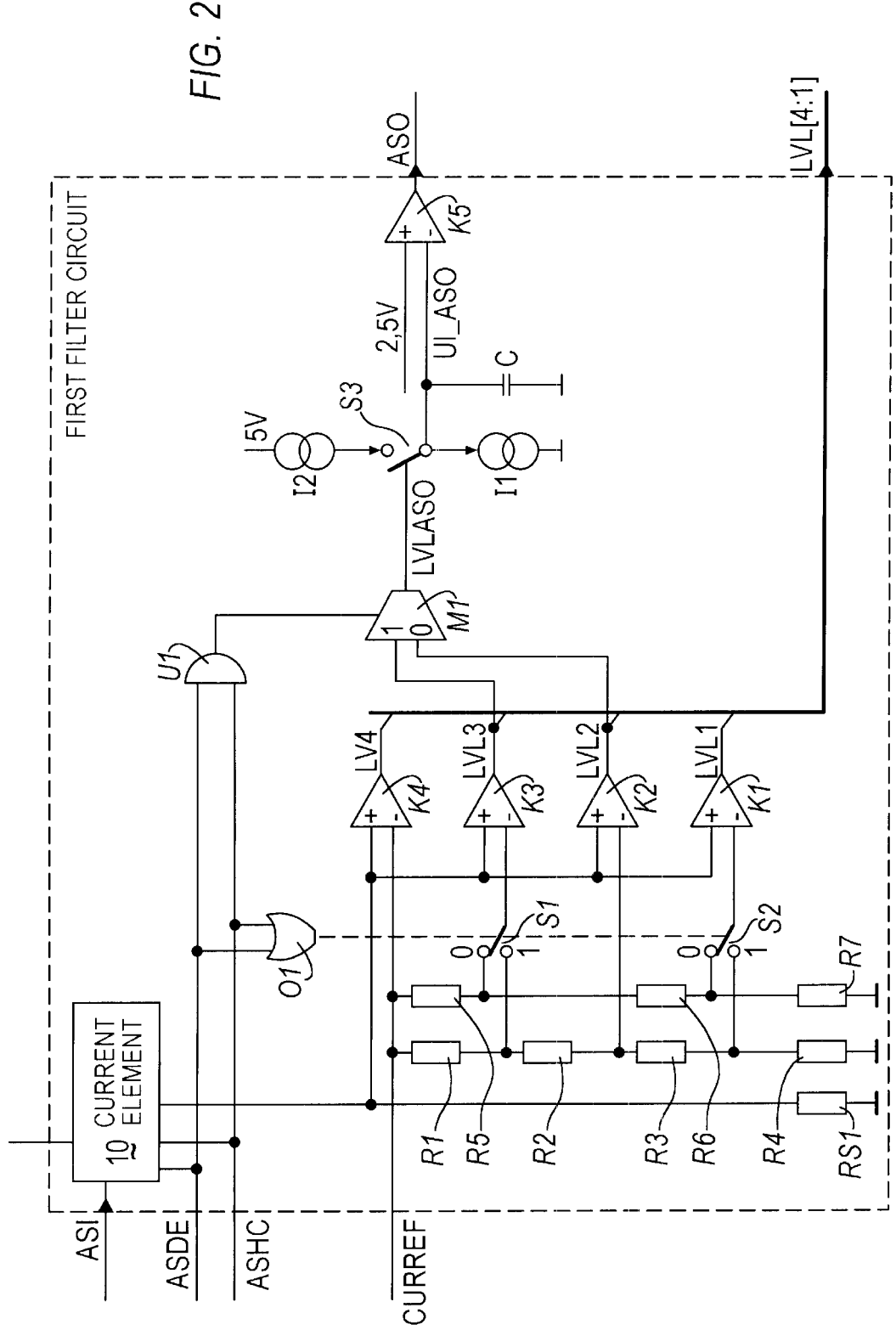
FIG. 2 is a first filter circuit.

FIG. 2 shows the first filter circuit which also comprises a circuit unit for conversion and distribution of the various current levels of the sensor signal into voltage levels. Two-level and three-level sensor signals may be applied. The filter circuit has a first input ASI for the sensor current signal which is connected to a voltage element 10 for current limitation and configurable current mirroring operation. By way of a second and a third control signal input ASDE, ASHC, which are likewise connected to the circuit element 10, it is possible to adjust the mirroring factor which defines the ratio between the input current and the output current of the circuit element 10, thereby permitting an adaption of the filter circuit to different sensors with varying current levels and, thus, a standardization of the sensor current.

To mirror the sensor current, the output of the circuit element 10 is grounded by way of a shunt resistor RS1 at which a corresponding sensor voltage declines. In the case where the sensor module 3 or, respectively, the modulator 4 generates a suitable sensor voltage instead of the sensor current, current mirroring is, of course, not needed.

To evaluate the current levels converted into voltage levels, the sensor voltage is applied to the non-inverting inputs of a first to fourth comparator K1, K2, K3, K4. A reference current is fed to a fourth input CURREF of the filter circuit, and interposed between the input and the ground is a first series connection comprised of a first to fourth resistor R1, R2, R3, R4 and a second series connection comprised of a fifth to seventh resistor R5, R6, R7 connected in parallel thereto.

The fourth input CURREF is further connected to an inverting input of the fourth comparator K4. An inverting input of the third comparator K3 is connectable, by way of a first commutator S1, alternatively to a first tapping between the first and the second resistor R1, R2 or a second tapping between the fifth and the sixth resistor R5, R6. An inverting input of the second comparator K2 is connected to a third tapping between the second and the third resistor R2, R3. An inverting input of the first comparator K1 is finally connectable, by way of a second commutator S2, alternatively to a fourth tapping between the third and the fourth resistor R3, R4 or a fifth tapping between the sixth and the seventh resistor R6, R7. The commutators S1, S2 are actuated by way of the output of a first OR element O1 whose inputs are connected to the second and third input port ASDE, ASHC of the filter circuit.

With this circuit unit, the sensor signal prevailing at the first input AS1 is grouped in five different current or voltage levels. These levels designate the following conditions:

a) too low sensor supply current (when no sensor is connected, or the sensor is defective),
b) sensor closed-circuit current is in the nominal range,
c) data signal is on a high level (only in three-level sensors),
d) motion signal is on a high level,
e) too high sensor supply current (when there is a short circuit to ground at the input, or the sensor is defective).

The reference voltages are produced by means of the reference current prevailing at the fourth input CURREF and the two resistor series connections and are constant due to the standardization of the sensor current for all sensors, with the exception of the case where low potential is applied to the second and third input ASDE, ASHC and the commutators S1, S2 are acted upon for switch-over between two voltage thresholds.

A first to fourth output signal LVL1 to LVL4 is applied to the respective output of the first to fourth comparator K1 to K4 in dependence on the instantaneous sensor voltage level. These signals are sent to the second filter circuit (output LVL[4:1]) for filtering the data signal. For filtering the motion signal, the output signals LVL2 and LVL3 of the second or third comparator K2, K3 are sent to a first multiplex unit M1. To control this multiplex unit, a first AND element U1 is provided, at the inputs of which the second and third control signal input ASDE, ASHC are applied and the output of which is connected to a control input of the first multiplex unit M1.

The first multiplex unit M1 is actuated so that in the case of a two-level sensor the output signal LVL2 of the second comparator K2 and in the case of a three-level sensor the output signal LVL3 of the third comparator K3 is connected through as a comparator signal LVLASO and sent to a control port of an analog switch S3. The illustrated first filter circuit is rated for a three-level sensor because the motion signal must be shortened in this case in favor of the transmission of the data signals. Thus, the analog switch S3 is opened and closed in response to the motion signal reaching the threshold which is produced by the reference current introduced into the fourth input CURREF.

Closing and opening of the analog switch S3 causes interconnection of a first and a serially connected second current source I1, I2 which are connected between a positive supply voltage (5V) and ground. Connected in parallel to the first current source I1 is a capacitor C which is permanently charged with a constant current. By closing of the analog switch S3 an additional current (approximately 2*I1) will flow so that an essentially linearly rising or declining course of the voltage UI_ASO at the capacitor is achieved. The capacitor voltage is supplied to a non-inverting input port of a fifth comparator K5. A constant voltage of 2.5 volt approximately is applied to an inverting input of the fifth comparator K5 which has a hysteresis $U_{th}$. The output of the fifth comparator K5 is connected to an output port ASO of the first filter circuit to which the delayed motion sensor pulse signal ASL3 is applied.

It is important for the function of the first filter circuit that the motion signal (wheel pulse) can always charge the capacitor C until the limit. All tolerances of the sensor pulse width, of scatterings of the capacity value of the capacitor C and tolerances of the currents of the first and second current source I1, I2 should be taken into consideration. The hysteresis of the fifth comparator K5 is chosen to be maximally great because it is directly included in the suppression of noises. Another demand is that the delay of the analog switch S3 upon opening and closing is of no particular interest with respect to the analog delay. On the other hand, the delay of the fifth comparator K5 is of no significance as long as said's delay time is shorter than the sensor pulse duration.

Figure 3:
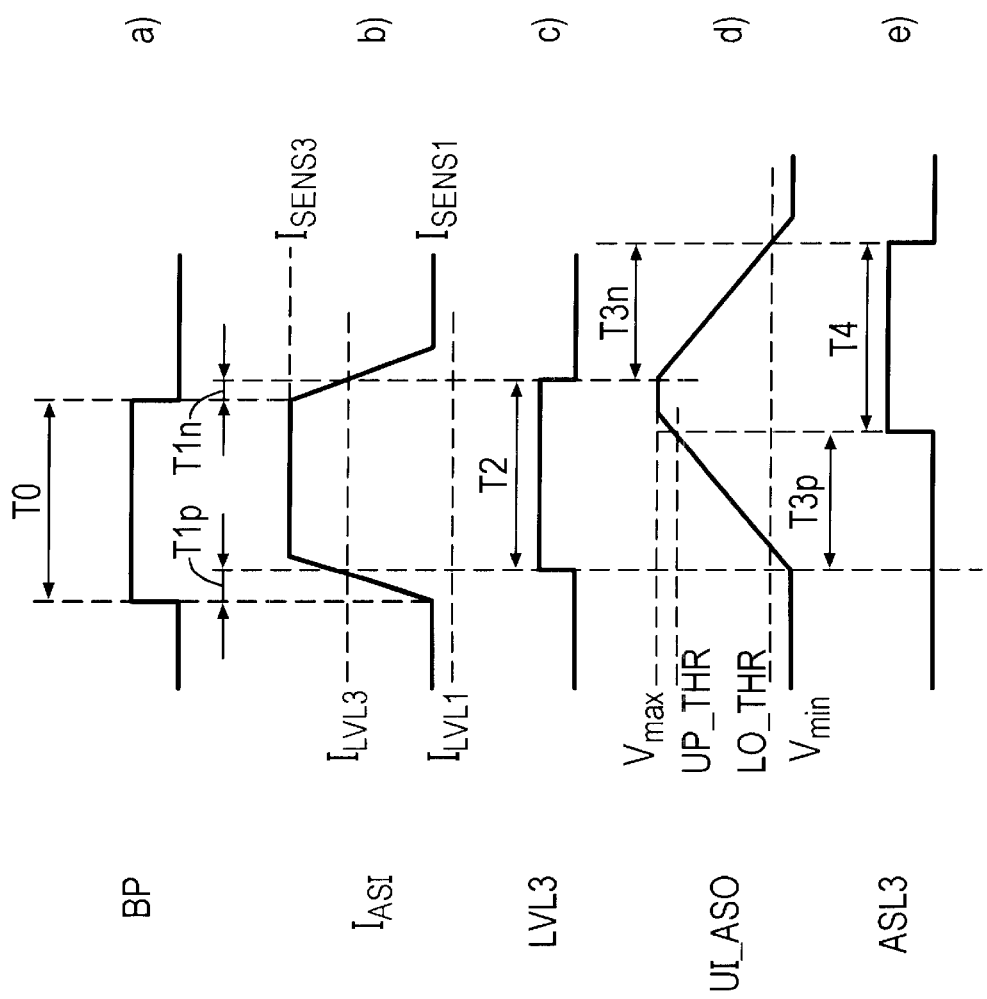
FIG. 3 shows various signal courses in the first filter circuit.

The function of the first filter circuit shall be explained in the following by way of the voltage and current variations shown in FIG. 3. Due to a motion of the encoder 1, a sensor pulse voltage BP (motion signal) is produced in the sensor, the pulses of which voltage after a corresponding conditioning according to FIG. 3a are essentially rectangular and have a generally constant pulse duration T0. The sensor current $I_{ASI}$ generated by the modulator 4 is shown in FIG. 3b. With a leading edge of the sensor pulse BP, this current rises from a first value $I_{SENS1}$ which is slightly above the first current threshold $I_{LVL1}$ essentially linearly until a third value $I_{SENS3}$. When the third current threshold $I_{LVL3}$ is reached upon expiry of a first duration T1p, the output LVL3 of the third comparator K3 switches to high level according to FIG. 3c so that the analog switch S3 is closed and the capacitor C charged.

The course of the voltage UI_ASO at the capacitor C and, thus, also at the non-inverting input of the fifth comparator K5 is illustrated in FIG. 3d. This voltage rises from a minimum value Vmin below a bottom threshold value LO_THR substantially linearly to a maximum value Vmax which is produced by the supply voltage of 5 volt and lies above a top threshold value of UP_THR. When the voltage UI_ASO reaches the top threshold value UP_THR=2.5 volt+$U_{TH}$/2 upon expiry of a second duration T3p, the output voltage ASL3 of the fifth comparator K5 at the output ASO is set to a high level according to FIG. 3e.

As soon as the sensor pulse voltage BP according to FIG. 3a drops to a low level again after expiry of the pulse duration T0, the sensor current $I_{AS1}$ also declines again substantially linearly to its original first value $I_{SENS1}$ according to FIG. 3b. When the third current threshold $I_{LVL3}$ is reached upon expiry of a third duration T1n, the high level (with fourth duration T2) of the output signal LVL3 of the third comparator K3 is reset to a low level according to FIG. 3c. This will reopen the analog switch S3 so that the capacitor voltage UI_ASO declines from its maximum value Vmax substantially linearly to its original minimum value Vmin again according to FIG. 3d. When the bottom threshold value LO_THR=2.5 volt-$U_{TH}$/2 is reached upon expiry of a fifth duration T3n, the high level (with sixth duration T4) of the output ASL3 of the fifth comparator K5 is reset to the low level again according to FIG. 3a.

Thus, an integration of the sensor current $I_{ASI}$ is effected with the first filter circuit. The value ASL3 prevailing at the output of the filter circuit changes its level as soon as the top or the bottom threshold value UP_THR, LO_THR of the fifth comparator K5 is reached. In the case of noise immunity, this leads to a constant delay of the filter output signal ASL3 (=ASO) with respect to the sensor signal prevailing at the input by the sum of the first and the second duration T1p, T3p, and this sum shall be referred to as first filter time and the sum of the third and the fifth duration T1n, T3n shall be referred to as second filter time accordingly. A noise of the above-mentioned type which superposes a fault current on the sensor signal useful current, provided it is shorter than the filter time, will not cause a variation of the output signal ASL3 of the fifth comparator K5 but only renders the delay longer.

Thus, the filter circuit should be rated so that a longest possible filter time is achieved and any noise-induced extension of the filter time remains in a tolerable range, that means, that a connected controller interprets the noise only as a minor difference in speed.

The second and fifth duration T3p, T3n can maximally become as long as the minimum pulse duration T0. When a noise of the mentioned type occurs, this causes a change in sign of the rise of the capacitor voltage UI_ASO. It shall be assumed, for example, that the sensor current $I_{ASI}$ has exceeded the third threshold value $I_{LVL3}$, however, the second duration T3p has not yet lapsed. The result of this noise will then be that the already integrated voltage UI_ASO at the capacitor C is added with a negative sign for the duration of the noise. In order that the output signal is switched correctly nevertheless, this addition with a negative sign must be cancelled again when the noise is eliminated. This lasts exactly as long as the duration of the noise itself. It can be taken from FIG. 3 that a noise remains without effect when its duration does not exceed the value $T_{stör}$=0.5*(T2-T3p). A second and fifth duration T3p, T3n of 70% of the sensor pulse duration T0 has proved especially favorable. A detailed explanation in this respect will follow further below.

An example of calculation shall be stated in the following:

The critical case for which the filter circuit must be rated is the shortest fourth duration T2min, within which the capacitor C must be charged until the supply voltage Vmax. The following values shall be assumed:

duration of a sensor pulse BP:

T0=40 to 60 $\mu s$;

first to fourth current thresholds:

$I_{LVL1}$=4.5 ma, $I_{LVL2}$=10 ma, $I_{LVL3}$=20 ma, $I_{LVL4}$=38 ma;

threshold tolerance: +/−10% first to third sensor current:

$I_{SENS1}$=7 ma, $I_{SENS2}$=14 ma, $I_{SENS3}$=28 ma;

sensor tolerance: −16% up to 20%;

capacitor tolerance: $C_{Tol}$=+/−30%;

hysteresis: $U_{Hyst}$=2 volt;

current rise speed of the sensor:

$SR_I$=6–14 ma/$\mu s$;

minimum fourth duration $$T2\text{min}=T0\text{min}+T1\text{min}-T1\text{max};$$

maximum delay of the first duration T1p until the third comparator K3 switches its output LVL3 to a high level:

$$T1p\text{max}=(I_{LVL3}\text{max}-I_{SENS1}\text{min})/SR_I\text{min}$$

$$T1p\text{max}=(22\text{ ma}-5.88\text{ ma})/6\text{ ma}/\mu s$$

$$T1p\text{max}=2.69\ \mu s;$$

minimum delay of the third duration T1n until the third comparator K3 switches its output LVL3 to a lower level:

$$T1n\text{min}=(I_{SENS3}\text{min}-I_{LVL3}\text{max})/SR_I\text{max}$$

$$T1n\text{min}=(23.52\text{ ma}-22\text{ ma})/14\text{ ma}/\mu s$$

$$T1n\text{min}=0.11\ \mu s;$$

minimum fourth duration T2min, within which the capacitor shall be charged at the latest in order to ensure an equal delay from leading to trailing edge of the capacitor voltage:

$$T2\text{min}=(40+0.11-2.69)\mu s$$

$$T2\text{min}=37.42\ \mu s;$$

charging of the capacitor:

$$UI\_ASO=(I1*t)/C$$

Maximum capacity value of the capacitor at which the capacitor voltage, with a minimum sensor pulse width, still reaches the limit:

$$C\max=(I1*T2\min)/(V\max-V\min)$$

$$C\max=C*(1+C_{Tol})$$

$$C=(I1*T2\min)/(V\max-V\min)/(1+C_{Tol})$$

Detecting the Noise Which can be Maximally Suppressed:

A noise causes a change in the sign of the integration. In the case reviewed hereinabove, this means that the end value will not be reached. This case is especially critical for the sensor pulse because said pulse is shorter than the pulse by which data are transmitted. Therefore, rating must be so that the change-over threshold is lower than the limitation and change-over takes place even in the event of a noise.

The maximum suppressible noise is calculated as follows:

$$T_{stör}\max: 0.5*(T2\min-T3p)$$

$$T3p=(UP\_THR-V\min)*C*(1+C_{Tol})/I1$$

$T_{stör}$max should amount to roughly 15% of T2min. This means for the value UP_THR:

$$UP\_THR=0.7*(V\max-V\min).$$

Hence, the result for the value LO_THR is:

$$LO\_THR=0.3*(V\max-V\min)$$

Determination of the Specified Parameters:

It is not easily possible to measure internal quantities within an integrated circuit. In particular, the capacity of the capacitor and the current value cannot be measured from outside. However, because it is only the suppression of noises per se which is of interest, that means the time which is required to switch over the output signal ASO of the filter circuit, the following measurement can be performed: There is feedback of the delayed sensor pulse signal, which prevails at the output ASO, at the first inport port AS1 in such a manner that an oscillation is achieved. This oscillation represents the internal charge and discharge of the capacitor within the two thresholds UP_THR and LO_THR and is the standard for the suppression of noises:

$$0.22*37\ \mu s</=T_{L\_ASO}=T_{H\_ASO}</=0.4*37\ \mu s$$

The delay between a change of the sensor current and the reaction at the output port ASO of the filter circuit is measured in another test. This test shows whether the output switches correctly even at the shortest wheel pulse:

$$0.4*37\ \mu s</=T3p=T3n</=0.7*37\ \mu s.$$

Figure 4:
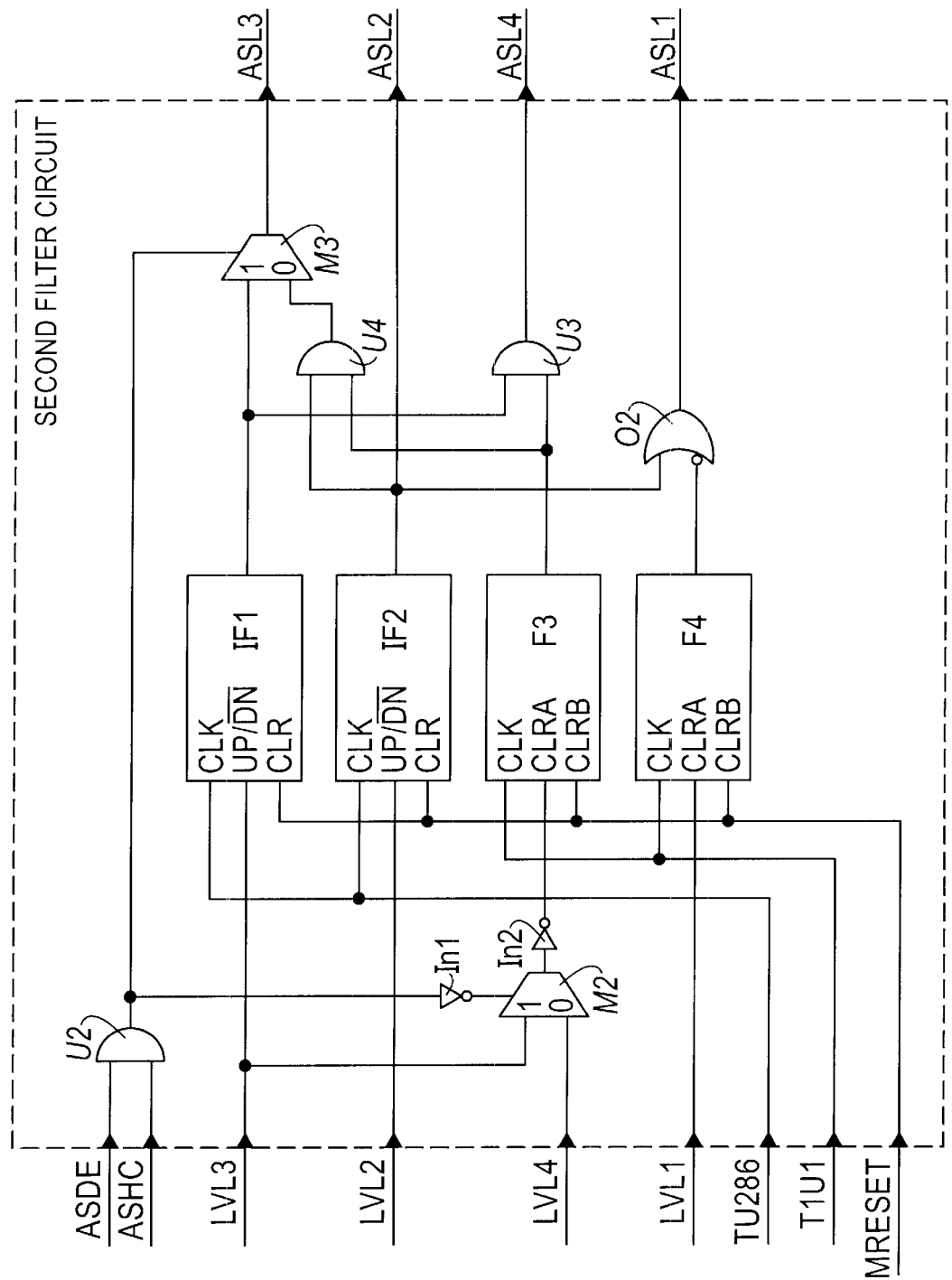
FIG. 4 shows a second filter circuit.

FIG. 4 shows a block diagram of a digital second filter circuit which is especially provided for the data signals transmitted with the sensor signals. The circuit unit which comprises the circuit element 10, the first to fourth comparator K1 to K4, the first to seventh resistor R1 to R7, the first and second commutator S1, S2, the shunt resistor RS1 and the first OR element 01 is not shown. Instead of the first input ASI for the sensor signal, four inputs LVL1, LVL2, LVL3, LVL4 are provided to which the corresponding outputs of the first to fourth comparator K1 to K4 according to FIG. 2 (therein the outputs LVL[4:1])) are respectively applied. The second and third input ASDE, ASHC according to FIG. 2 is present also in this case.

The second filter circuit comprises for each sensor generally a first and a second integrating digital filter IF1, IF2, and a third and a fourth simple digital filter F3, F4. Clock inputs CLK of the first and second filter IF1, IF2 are connected to a first clock input TU286 of the filter circuit, and clock inputs CLK of the third and fourth filter F3, F4 are connected to a second clock input T1U1 of the filter circuit. Further, reset inputs CLR CLRB of the first to fourth filter IF1 to F4 are connected to a reset input MRESET of the filter circuit.

The second and the third input ASDE, ASHC are linked to each other by way of a second AND member U2, and the said's output signal is led by way of a first inverter In1 to the control input of a second multiplex unit M2, on the one hand, and further to the control input of a third multiplex unit M3, on the other hand. Input LVL3 is applied to a one input of the second multiplex unit M2, input LVL4 is applied to a zero input of the second multiplex unit M2, and the output of the second multiplex unit M2 is connected to an input CLRA of the third filter F3 by way of a second inverter In2. The input LVL3 of the second filter circuit is connected to the input UP/DN of the first filter IF1, and the input LVL2 is connected to an input UP/DN of the second filter IF2, and the input LVL1 is connected to the input CLRA of the fourth filter F4.

To perform a plausibility check, the output signals of the filters are linked to each other as follows: the output of the first filter IF1 is applied to a one input of a third multiplex unit M3 and a first unit of a third AND element U3. The output of the second filter IF2 is applied to a first input of a fourth AND element U4, a first input of a second OR element O2, and a second output ASL2 of the filter circuit. The output of the third filter IF3 is connected to a second input of the third AND element U3 and a second input of the fourth AND element U4. The output of the fourth filter IF4 is connected to an inverting second input of the second OR element O2.

The output of the third AND element U3 is connected to the fourth output ASL4 of the second filter circuit, while the output of the second OR element O2 is connected to the first output ASL1 of the second filter circuit. The output of the fourth AND element U4 is applied to the zero input of the third multiplex unit M3, whose output is connected to the third output ASL3 of the filter circuit.

The data signal is delayed by a constant time with the third and the fourth (simple) digital filter F3, F4, and these filters are reset immediately when a fault information no longer exists. The first and the second (integrating) digital filter IF1, IF2 principally operates like the analog sensor signal filtering according to FIG. 2. The signals at the inputs LVL2, LVL3 predefine the counting direction of the counters in the first and the second filter IF1, IF2. A top and a bottom stop limitation is implemented in each counter. As soon as these stops are reached, the counter concerned is blocked for the corresponding counting direction, and the signal at the respective output changes corresponding to the counting direction.

The plausibility check is additionally provided because of the different filter characteristics of the digital filters. This check implies that values cannot have fallen below the bottom current value corresponding to a signal at the first output ASL1 when the surpassing current value corresponding to a signal at the second output ASL2 is still being exceeded. Accordingly, this also applies for the current values which are represented by output signals at the third and fourth output ASL3, ASL4.

This digital second filter circuit is provided especially for filtering noises due to a lacking electromagnetic compatibility (EMC) of other devices. For an overcurrent and undercurrent caused thereby, the bottom time limit results from the demand that an overcurrent be identifiable in the event of a motion sensor signal. Noises which relate to a data protocol are filtered out with the first and second integrating digital filter IF1, IF2. The second and third current threshold LVL2, LVL3 is used for the data protocol. The first and second filter IF1, IF2 functions in a similar way as the analog first filter circuit for the motion sensor signals, however, the current threshold evaluation is used to actuate an up or down counter. A critical case is encountered in the pause between the motion pulses and the data pulses. The integrating filters are initially at the top stop and must be able to return to zero in the pause. Both the analog values and the tolerance of the time basis are included in these reflections.

Figure 5:
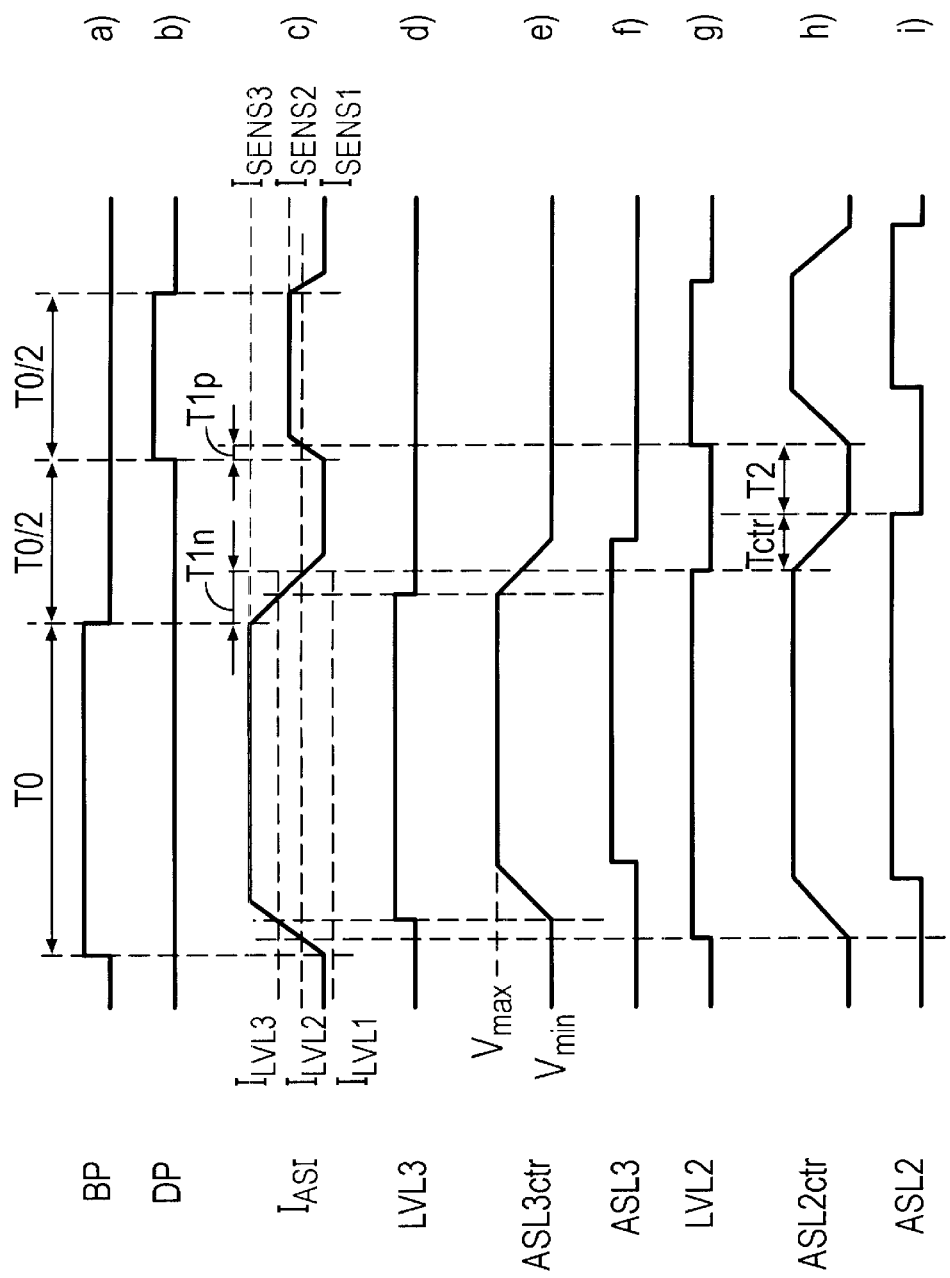
FIG. 5 shows various signal courses in the second filter circuit.

FIG. 5 shows the various voltage and current courses in the second filter circuit according to FIG. 4.

A motion of the encoder 1 causes generation of a motion sensor pulse voltage in the sensor, the conditioned pulses BP of which voltage are generally rectangular and have a generally constant pulse duration T0 according to FIG. 5a. Further, according to FIG. 5b, a data signal shall be transmitted which is likewise composed of generally rectangular pulses DP that are produced at a distance of approximately T0/2 after a sensor pulse BP and have a duration of also T0/2. These two pulse trains are sent to the modulator 4.

The total sensor current $I_{ASI}$ induced by the modulator 4 is shown in FIG. 5c. With a leading edge of the sensor pulse BP, this current rises from a first value $I_{SENS1}$ which is slightly above the first current threshold $I_{LVL1}$ substantially linearly until a third value $I_{SENS3}$. The input LVL2 switches to the high level according to FIG. 5d when the second current threshold $I_{LVL2}$ is reached, and the input LVL3 switches to the high level according to FIG. 5d when the third current threshold $I_{LVL3}$ is reached.

Upon expiry of the duration T0 and at the end of the motion pulse BP, the sensor current $I_{ASI}$ declines substantially linearly again to its first value $I_{SENS1}$. When the third current threshold $I_{LVL3}$ is reached, the input LVL3 will reassume low potential according to FIG. 5d, and also input LVL2 will drop to its low level again according to FIG. 5g when the second current threshold $I_{LVL2}$ is reached upon expiry of the duration T1n.

With a leading edge of the data pulse DP, the sensor current $I_{ASI}$ rises substantially linearly from its first value $I_{SENS1}$ to a second value $I_{SENS2}$. When the second current threshold $I_{LVL2}$ is reached upon expiry of the duration T1p, again the second input LVL2 is switched to a high level according to FIG. 5g. In the opposite way, the sensor current $I_{ASI}$ declines substantially linearly to its first value $I_{SENS1}$ with the end of the data pulse DP upon expiry of the duration T0/2, and the input LVL2 will readopt its low level when the second current threshold $I_{LVL2}$ is reached (see FIG. 5g).

FIG. 5e shows the variation of a third counter voltage ASL3ctr which rises from a minimum value Vmin substantially linearly to a maximum value Vmax when the third input voltage LVL3 assumes the high potential according to FIG. 5d. In the opposite way, the counter voltage ASLctr declines again to the value Vmin when the third input voltage LVL3 readopts the low potential. The corresponding variation of the third output voltage ASL3 is shown in FIG. 5f. This voltage assumes a high level when the third counter voltage ASL3ctr has reached its maximum value Vmax and declines again to a low level when the counter voltage ASL3ctr readopts the minimum value Vmin.

FIGS. 5h and 5i show the courses of a second counter voltage ASL2ctr and the second output voltage ASL2 in dependence on the second input voltage LVL2. Subsequently, the second counter voltage ASL2ctr rises with a leading edge of the second input voltage LVL2 from its minimum value Vmin to its maximum value Vmax and declines again with a trailing edge of the second input voltage LVL2 within a duration Tctr to its minimum value Vmin. When the second counter voltage ASL2ctr has reached its maximum value, the second output voltage ASL2 according to FIG. 5i also switches over to high potential. This potential changes again to the low value when the second counter voltage ASL2ctr has reached its minimum value again. Upon expiry of the duration T2, also the second counter voltage ASL2ctr will rise again with the leading edge of the second input voltage LVL2 according to FIG. 5g. After said's maximum value is reached, the second output voltage ASL2 will be switched over to high level. With the trailing edge of the second input voltage LVL2 the second counter voltage ASL2ctr will decline again and, after having reached its minimum value, will switch also the second output voltage ASL2 again to a low level.

An example of calculation for the second filter circuit shall now be stated again in the following. An oscillator frequency f0=3.52 megacycles per second and an oscillator tolerance of +/−25% shall be assumed as a basis herefor.

T2>0 must remain for a correct function of the integrating first and second filter IF1, IF2:

$$T2=T0/2+T1p-T1n-Tctr>0.$$

To achieve a maximum possible insensitivity to noises, the filter time Tctr should become maximal. T2=0 in this case:

$$T1n \rightarrow \text{maximal},$$

$$T1p \rightarrow \text{minimal},$$

$$T0/2 \rightarrow \text{minimal}.$$

$$T1n\text{max}=(I_{SENS3}\text{max}-I_{LVL2}\text{min})/SR_I\text{min}$$

$$T1n\text{max}=(33.6 \text{ ma}-9 \text{ ma})/6 \text{ ma}/\mu s$$

$$T1n\text{max}=4.1 \text{ } \mu s$$

$$T1p\text{min } 32 \text{ } (I_{LVL2}\text{min}-I_{SENS1}\text{max})/SR_I\text{max}$$

$$T1p\text{min}=(9 \text{ ma}-8.4 \text{ ma})/14 \text{ ma}/\mu s$$

$$T1p\text{min}=43 \text{ nanoseconds}$$

$$Tctr\text{max}=T0/2 \text{ min}+T1p-T1n$$

$$Tctr\text{max}=(20+0.043-4.1)\mu s$$

$$Tctr\text{max}=15.86 \text{ } \mu s.$$

The counter is clocked with the oscillator frequency so that the time Tctr can be seen as a function of the counter reading N and the clock frequency:

$$Tctr=N/f0$$

$$Tctr\text{max}=N/f0\text{min}$$

$$N\text{max}=Tctr\text{max}*f0\text{min}$$

$$N\text{max}=15.86 \text{ } \mu s*(3.52 \text{ megacycles per sec.}*(1-0.25))$$

$$N\text{max}=41.$$

This counter reading is maximally attainable under unfavorable conditions and indicates the maximally achievable filter effect. Each noise causes a change in the counting direction of the filter so that the filter will reach its stop at a correspondingly later moment only and, consequently, will also change its output correspondingly later. This means in the case under review hereinabove that already minor noises are sufficient to prevent an alteration of the output. This makes a compromise between the filter effect and data suppression necessary. The compromise is especially favorable when the counter reading N is chosen as ⅔ of the above calculated maximum value, that means, as N=24.

The digital third and fourth filter F3, F4 shall be rated for overcurrent and undercurrent. The objective is to identify an overcurrent also during a motion sensor pulse. The minimum time $T_{Iover}$min of the overcurrent is calculated as follows:

$$T_{Iover}\text{min}=T0\text{min}-(I_{LVL4}\text{max}-I_{SENS1}\text{min})/SR_I\text{min}$$

$$T_{Iover}\text{min}=40\ \mu s-(41.8\ ma-5.88\ ma)/6\ ma/\mu s$$

$$T_{Iover}\text{min}=34\ \mu s.$$

This time is measured with the oscillator frequency divided by four so that the number of the periods can be stated as follows:

$$T_{Iover}\text{min}=N\text{max}/f0\text{min}*4$$

$$N_{max}=T_{Iover}\text{min}*f0\text{min}/4$$

$$N\text{max}=22.$$

In order to also sense overcurrents which occur only with a delay with respect to the commencement of the motion pulse, this value is reduced to N=18.

The device of the present invention is also apt for application with a passive motion sensor when there is provision of an interface device permitting the conversion of the sensor signals, whose amplitude is generally responsive to the motional speed, into corresponding signals with a motion-responsive frequency.

What is claimed is:

1. Method of suppressing signal noise found on the signal generated by an active motion sensor, wherein the signal includes a first sequence of input pulses that contain motion information, comprising the steps of:

integrating each input pulse so that the integrated signal rises during the input pulse and declines when no input pulse prevails, generating an output pulse between a time where the integrated signal is in excess of a predeterminable second threshold value after a predeterminable first threshold value has been exceeded and the time where the integrated signal during the decline lies below the first threshold value after having dropped below the second threshold value so that the output pulse is delayed in time with respect to the input pulse, and initiating a current flow upon sensing the input pulse, and initiating charging a charge storage device when the current flow reaches a predetermined value, wherein a charge of the charge storage device is the integrated signal.

2. Method as claimed in claim 1, further including the step of producing the integrated signal by charging or discharging a capacitor, and wherein the first and the second threshold value is in each case defined by a predetermined voltage value which declines at the capacitor.

3. Method as claimed in claim 1, wherein the integrated signal is produced by up or down counting of at least one counter and said integration is represented by a counter reading, and wherein the first and the second threshold value is respectively defined by a predetermined counter reading that is to be reached.

4. Method as claimed in claim 1, wherein the motion sensor is responsible for generating a second sequence of input pulses, wherein each input pulse of the first sequence is integrated by charging a capacitor and each input pulse of the second pulse sequence is integrated by activation of at least one counter.

5. The method according to claim 1, wherein the step of integrating further includes:

ceasing the current flow upon no longer sensing the input pulse; and ceasing charging the charge storage device upon no longer sensing the input pulse.

6. Sensor arrangement with an active sensor which generates a first sequence of input pulses that contain motion information, comprising:

a device for signal processing of the sensor signal, including one integrating filter circuit adapted to integrate each input pulse of a pulse train so that the integrated signal rises during the input pulse and declines when no input pulse is present, and an output circuit adapted to generate an output pulse between the time where the integrated signal is in excess of a predeterminable second threshold value but less than after a predeterminable first threshold value has been exceeded and the time where the integrated signal during the decline lies below the first threshold value after having dropped below the second threshold value so that the output pulse has a time delay with respect to the input pulse, and initiate a current flow upon sensing the input pulse; and initiate charging a charge storage device when the current flow reaches a predetermined value, wherein a charge of the charge storage device is the integrated signal.

7. Sensor arrangement as claimed in claim 6, wherein the integrating filter circuit includes an analog filter with a capacitor and at least one current source to which can be applied the input pulse for charging the capacitor and for generating the integrated signal, and the first and the second threshold value is in each case defined by a predetermined voltage value which declines at the capacitor.

8. Sensor arrangement as claimed in claim 7, further including a first and a second current source, and the first current source is adapted to precharge the capacitor with a constant first current and the second current source is adapted to receive the input pulse for achieving a virtually linear course of the integrated signal.

9. Sensor arrangement as claimed in claim 6, wherein the integrating filter circuit includes a digital filter with at least one counter, to which the input pulse can be applied for activation, wherein the integrated signal represents a counter reading and the first and the second threshold value is respectively defined by a predetermined counter reading that is to be reached.

10. The sensor arrangement according to claim 6, wherein the integrating filter is adapted to:

cease the current flow upon no longer sensing the input pulse; and cease charging the charge storage device upon no longer sensing the input pulse.

* * * * *